May 31, 1966      A. BOCCI      3,253,976
METHOD OF RECOVERING WASTE PAPER
Filed April 28, 1964
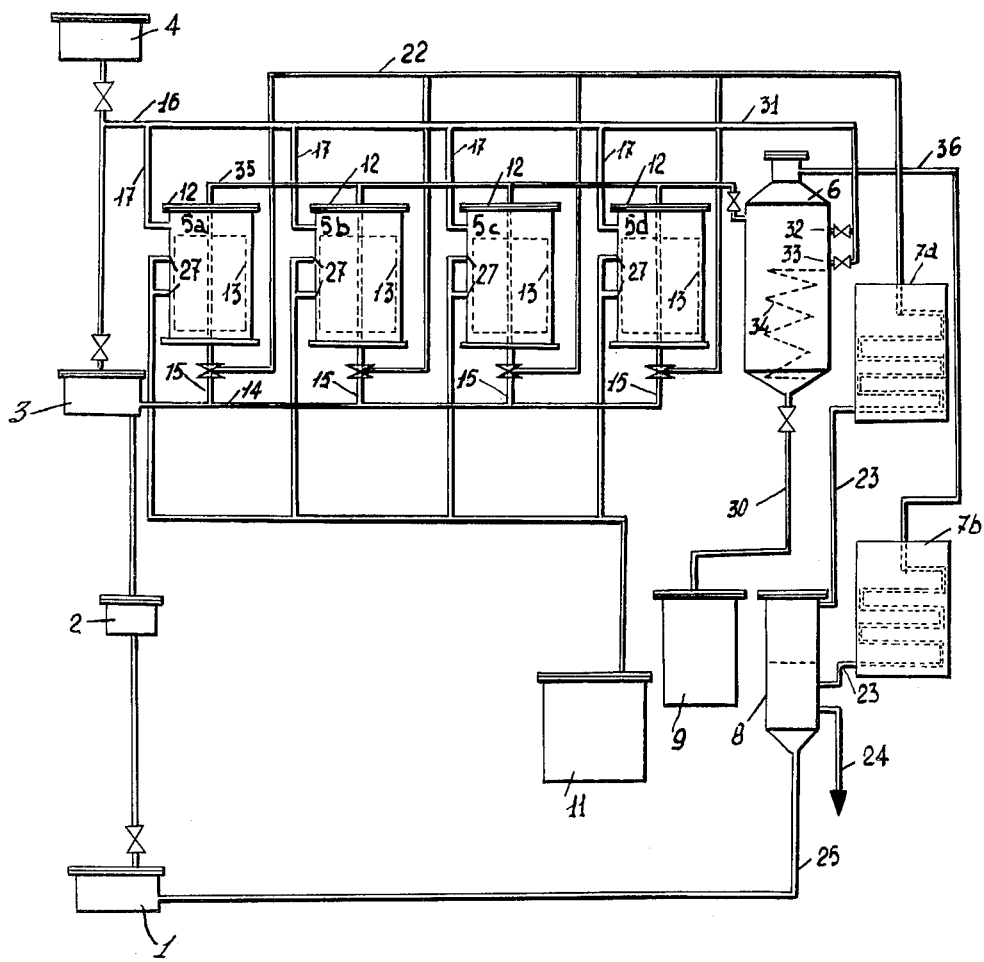

United States Patent Office 3,253,976
Patented May 31, 1966

3,253,976
METHOD OF RECOVERING WASTE PAPER
Aniello Bocci, Via Assarotti 29, Genoa, Italy
Filed Apr. 28, 1964, Ser. No. 363,099
Claims priority, application Italy, Jan. 4, 1960, 23/60,
Patent 624,421; Addition Sept. 26, 1960, 16,845/60
7 Claims. (Cl. 162—5)

This application is a continuation-in-part of copending Serial No. 69,174, filed November 14, 1960 and now abandoned.

It is well known to coat or impregnate paper or the like with synthetic resins such as polyethylene, acrylon and vinylite. Such paper is used for the manufacture of glasses, bottles or containers suitable for liquids.

It is also well known to treat paper with bitumen, tar and the like to waterproof the paper. Such compositions are also used as adhesives in the preparation of aluminum paper comprising a very thin sheet of aluminum or similar material adhesively united with a sheet of paper. As the use of such material has expanded considerably and as articles made from such material are customarily thrown away after use, there are available large amounts of waste and scraps which because of being covered or impregnated with resinous material are not conveniently usable for the preparation of waste paper pulp. The usual methods of recovering waste paper for the production of pulp are not applicable to materials of this kind.

An object of the present invention is to provide an improved process for removing resins, bitumen, tar and the like (herein referred to as resinous material) from waste paper so that the paper may be reused in the production of paper pulp or for other purposes.

In accordance with the process of the present invention, a suitable solvent for the resinous material with which the waste paper is impregnated or coated and in particular, a chlorinated hydrocarbon solvent such as trichloroethylene is preheated to a temperature at which the resinous material is most effectively dissolved by the solvent and is made to flow through a closed container within which the treated waste paper is introduced in its natural state and pressed so as to form a compact but permeable mass. The waste paper need not be shredded or otherwise comminuted but is suitably crushed and compacted, for example to provide a density of approximately 120 to 150 kilograms per cubic meter. The solvent is preferably preheated to a temperature of 60° to 70° C. The preheated solvent in flowing through the compacted mass of waste paper dissolves out the resinous material with which the paper is coated or impregnated, such material being carried off with the solvent. The direction of flow of solvent through the mass of waste paper is preferably upwardly from the bottom to the top of the container. The flow of preheated solvent through the compacted mass of waste paper should continue for at least 30 minutes and preferably from 60 to 90 minutes. The compacted mass of waste paper remains stationary in the container, no mechanical stirring or agitation being required. This greatly simplifies the process in accordance with the invention and the apparatus for carrying it out.

The solvent discharged from the container, together with the resinous material that has been dissolved out of the paper, is conducted to an enclosed aqueous pressure zone into the lower portion of which superheated steam is discharged so as to vaporize the solvent while leaving the resinous material in an aqueous solution at the bottom of the aqueous zone. The steam is preferably supplied to the aqueous pressure zone at a temperature of 150° to 160° C. The steam and solvent vapor are conducted from the upper portion of the enclosed aqueous pressure zone to a condensing zone where the steam and solvent vapor are condensed and separated from one another, for example by gravity separation.

When the dissolving of the resinous material from the paper scrap has been completed, the flow of solvent through the paper scrap mass is discontinued and superheated steam, preferably supplied at a temperature of 150° to 160° C., is passed through the compacted mass of paper scrap preferably in a downward direction. In flowing through the mass of waste paper, the steam vaporizes and removes the solvent. The resulting mixture of steam and solvent vapor discharged from the container is conducted to a condensing zone where the steam and solvent vapor are condensed and the resulting water and solvent are separated from one another. The solvent is reused while the water can either be reused or discharged to waste. The flow of steam through the mass of waste paper is preferably used for approximately the same time as the previous flow of preheated solvent through the waste paper mass i.e. at least 30 minutes and preferably from 60 to 90 minutes.

As soon as the flow of steam has been cut off, the closed vessel in which the mass of waste paper is contained is subjected to suction to withdraw the steam remaining in the vessel and the mass of waste paper. The suction is continued preferably for approximately the same period of time i.e. at least 30 minutes and preferably from one hour to 90 minutes. In this manner, the water content of the waste paper is reduced to approximately 8 percent without the need of applying any heat other than the residual heat resulting from the preheated solvent and steam.

The vessel containing the paper is then opened and the paper removed. The waste paper thus recovered is in a substantially dry state without any substantial structural change, but with the resinous or other impregnating or coating material removed. It is thus suitable for reduction to pulp or other use.

An installation for removing resins, bitumen, tar, etc. from waste paper in accordance with the present invention is shown schematically in the accompanying drawings.

With reference to the drawing, a suitable solvent and in particular, trichloroethylene is supplied from a reservoir 1 to a circulation pump 2 by which it is pumped through a preheater 3 to which heat is suitably supplied preferably in the form of superheated steam supplied by a boiler or steam generator 4. The steam is preferably supplied at a temperature of 150° C. to 160° C. and heats the solvent in the preheater 3 to a temperature at which the solvent is most effective in dissolving the impregnating or coating material of the waste paper, for example 60° to 70° C.

The preheated solvent is conducted from the preheater 3 through pipes 14 and 15 to one or another of four like pressure vessels 5a, 5b, 5c and 5d, each provided with a movable cover 12 and capable of withstanding a pressure of from 2 to 4 atmospheres. Each of the vessels 5a–5d is adapted to receive a foraminous container 13 such as a cage or basket having apertured walls in which the waste paper to be treated has been pressed and compacted so as to provide a compact and uniform, but pervious mass preferably having a density of 120 to 150 kilograms per cubic meter. The container 13 occupies substantially the entire cross-section of the pressure vessel. When the basket 13 containing the compacted waste paper has been placed in the respective pressure vessel 5a–5d, the cover 12 is replaced and fastened hermetically so as to close the vessel.

Each of the pressure vessels 5a–5d is connected at its bottom by pipes 14 and 15 with the solvent preheater 3 and at its top through piping 35 to an aqueous pressure zone shown in the form of a still 6. Pipes 15 are controlled by valves so that preheated solvent from the preheater 13 can be supplied to a selected pressure vessel whereupon it flows up through the compacted mass of waste paper held in the basket 13 in the pressure vessel and flows out at the top through piping 35 to the upper portion of still 6. The resin or other coating material of the waste paper is thereby dissolved from the waste paper and the resulting solution comprising the solvent and the dissolved resinous material is discharged into the still 6. The pressure vessels 5a–5d are not provided with heaters but may be heat insulated to preserve the temperature of the preheated solvent flowing through the vessels.

Superheated steam, for example at a temperature of 150° to 160° C., is supplied from the steam generator 4 to the still 6 through suitable piping 16, 31. A selected portion of the steam may be discharged into the upper portion of the still 6 through a valve 32 while the remainder under control of valve 33 passes through a coil 34 inside the still vessel and is discharged into the lower portion of the still. The solvent is vaporized by the steam and the resulting mixture of steam and solvent vapor is discharged from the upper portion of the still being conducted by piping 36 to a condenser 7b. The resulting condensate flows through piping 23 into a gravity separator 8 from which the separated solvent returns through piping 25 to the supply reservoir 1 while the water is discharged through pipe 24.

The resinous material remains in the still 6 in aqueous suspension and is discharged periodically through piping 30 into a collecting tank 9.

After the flow of heated solvent through a selected pressure vessel 5a–5d has been discontinued, steam is admitted to the upper portion of the vessel by piping 16–17 and is discharged from the bottom of the vessel. In passing through the compacted waste paper mass in the vessel, the superheated steam vaporizes and removes the remaining solvent and the resulting mixture of steam and solvent vapor is conducted by piping 22 to a condenser 7a. The resulting condensate is conducted by piping 23 to the gravity separator 8 where the solvent and water are separated as described above.

A suction pump 11 is also connected to each of the pressure vessels 5a–5d through the piping 26 and connections 27 at the side of the vessel. After the flow of steam through a selected pressure vessel has been discontinued, suction is at once applied to the vessel so as to draw off the remaining steam and thereby reduce the water content of the waste paper mass.

The installation works as follows.

The waste paper from which resinous or other coating or impregnating material, for example polyethylene, is to be removed, is introduced and packed into the baskets 13 and these are placed in the pressure vessels 5a–5d which are then closed hermetically by covers 12.

In the first step, the polyethylene or other resinous material is washed from the waste paper mass. The circulating pump 2 forces the solvent, for example trichloroethylene, through the preheater 3 and then through conduits 14, 15 to pressure vessel 5a. The hot solvent, which has preferably been heated to a temperature of 60° to 70° C., flows up through the compacted mass of waste paper in the pressure vessel 5a thereby dissolving out the resinous coating material. The resulting solvent—resin solution is conducted by piping 35 to the still 6 where the solvent is evaporated by superheated steam supplied at a temperature of 150° to 160° C. from the steam generator 4. The resulting mixture of steam and solvent vapor flows through conduit 36 to condenser 7b where it is condensed. The condensate flows through conduit 23 and into gravity separator 8 from which the solvent flows through conduit 25 back to the reservoir 1 while water is discharged through conduit 24.

In the second step, the trichloroethylene or other solvent, which is still wetting or impregnating the waste paper, is removed. For this purpose, superheated steam at about 150° to 160° C. is conducted by piping 16, 17 into the upper portion of the respective pressure vessel 5a–5d. The solvent still adhering to the paper is vaporized by the steam and furthermore, the steam owing to its pressure and motion acts to remove mechanically any solvent not evaporated so as to carry it away from the paper. The resulting mixture of steam and solvent is conducted through piping 22 from the bottom of the respective pressure vessel to the condenser 7a where the components are liquified and pass through piping 23 to the gravity separator 8. The solvent, being heavier than water, is returned through pipe 25 to the supply reservoir 1 while the water is discharged through piping 24.

The third step serves to dry the waste paper which has now been washed. For this purpose, the respective pressure vessel 5a–5d is connected through piping 26 to a suction pump 11 which draws off the superheated steam still contained in the vessel so as to avoid condensation of the steam on the paper. By reason of the residual heat resulting from the heating of the waste paper first by the preheated solvent in the first step of the process and then by the superheated steam in the second step, it is not necessary to apply additional heat during the drying operation. By drawing off the superheated steam immediately after termination of the flow of steam through the pressure vessel, condensation of the steam is avoided and a substantially dry product having a moisture content not exceeding 8 percent is obtained.

As a fourth step, the respective pressure vessel is opened by removing the cover 12 and the basket 13 containing the washed and dry waste paper is removed. Since the paper has remained substantially stationary in the basket throughout the process without mechanical stirring or agitation, the paper is not reduced to pulp as in some previous processes, but retains substantially its original structural form. However, the polyethylene or other coating material has been removed and the waste paper is hence suitable for pulping or other uses. The cycle is completed by pressing a new charge of waste paper in a basket 13, preferably to a density of 120 to 150 kilograms per cubic meter, inserting the filled basket in the respective pressure vessel and closing the lid 12.

The installation illustrated schematically in the drawing is particularly advantageous in that it comprises four pressure vessels 5a, 5b, 5c and 5d interconnected in such manner with the other components of the installation that each of the pressure vessels can be used in carrying out all steps of the process but the pressure vessels are operated in a predetermined phase relation to one another so that at any given time, each is carrying out a different step. For example, while the washing operation of step 1 is being carried out in vessel 5a, the solvent removal operation of step 2 may be carried out in vessel 5b and the removal of steam by suction may be effected in pressure vessel 5c while vessel 5d is being opened to remove a completed batch of waste paper and insert a new batch in accordance with step 4. With this procedure, the solvent preheater 1 can be operated continuoulsy at a uniform rate since it is always supplying heated solvent to one, and only one, of the pressure vessels. Similarly, the still 6 can be operated continuously and uniformly, since it is always receiving solvent-resin solution from one and only one of the pressure vessels 5a–5d. The steam generator 4 likewise operates continuously and uniformly since it is always supplying steam to the still 6 and to one only of the pressure vessels 5a–5d. In similar manner, the suction pump 11 and the condenser 7a, 7b function continuously and at a uniform rate. This results in highly efficient use of the equipment and avoids the need of excessively large components to take care of intermittent peak loads. Moreover, the absence of stirring or agitating equipment—customary in previous apparatus—further contributes to the low cost of installing and operating the installation in accordance with the present invention. It will be understood that although each of the four pressure vessels 5a–5d is involved in a different step of the process at any given time, the baskets containing the waste paper being washed are not moved from one pressure vessel to another during the process, but each remains throughout the process in the pressure vessel in which it is inserted. Thus, for example a batch of coated waste paper placed in pressure vessel 5a remains in that vessel throughout all steps of the process and is removed from pressure vessel 5a only when the entire process on that batch of material has been completed. Hence, minimum handling of the material is required and this further decreases the cost of the process in accordance with the present invention.

While a preferred embodiment of the invention has been illustrated and particularly described, it will be understood that the invention is in no way limited to this particular embodiment, but may be modified as desired to suit the particular material being treated.

What I claim:

1. A process for removing resinous material from waste paper, comprising crushing and compacting a mass of said waste paper in a foraminous container, confining said waste paper mass in said container in a treatment pressure vessel having top and bottom conduit connections, continuously preheating a chlorinated hydrocarbon solvent to a temperature of about 60° C. to 70° C., passing said preheated solvent through said mass of waste paper while stationary in said vessel to remove said resinous material, with the direction of flow from the bottom to the top of said vessel, conducting solvent discharged from the top of said vessel to a separation pressure vessel, discharging superheated steam at a temperature of 150° C. to 160° C. into the lower portion of said separation vessel to vaporize said solvent while leaving said resinous material in aqueous suspension, conducting said steam and solvent vapor to a condenser to separately condense and separate said solvent and water and thereby recover said solvent, discontinuing the flow of said solvent through said stationary mass, flowing superheated steam through said stationary mass of waste paper in a direction from the top to the bottom of said treatment vessel to vaporize and remove said solvent from said mass, conducting said steam and solvent to said condenser to separate said solvent and water, discontinuing the flow of said steam through said mass and forthwith applying suction to said vessel to remove said steam therefrom, whereby said waste paper is recovered in a substantially dry state without substantial structural change but with said resinous material removed.

2. A process according to claim 1, in which said waste paper is compacted in said foraminous container to a density of approximately 120 to 150 kilograms per cubic meter.

3. A process for removing resinous material from waste paper, comprising crushing and compacting a mass of said waste paper in a foraminous container, confining said waste paper mass in said container in a first one of a plurality of like pressure vessels having top and bottom conduit connections, continuously preheating a solvent consisting essentially of trichloroethylene to a temperature of about 60° C. to 70° C., passing said preheated solvent through said mass of waste paper in an upward direction while said mass is stationary in said vessel to remove said resinous material, conducting solvent discharged from the top of said vessel to an enclosed aqueous pressure zone, discharging superheated steam into the lower portion of said zone to vaporize said solvent while leaving said resinous material in aqueous suspension, conducting said steam and solvent vapor to a condenser to separately condense and separate said solvent and water and thereby recover said solvent, discontinuing the flow of said solvent through said stationary mass of waste paper, flowing superheated steam through said stationary mass of waste paper in said first vessel in a downward direction to vaporize and remove said solvent from said mass, conducting said steam and solvent discharged from said first vessel to said condenser to separate said solvent and water, concurrently in like manner preheated solvent through a second compated mass of waste paper in a second like pressure vessel and recovering said solvent, discontinuing the flow of said steam through said mass of waste paper in said first vessel and forthwith applying suction to said first vessel to remove said steam therefrom while concurrently in like manner discontinuing the flow of preheated solvent through said mass in said second vessel and passing superheated steam therethrough, conducting said steam and solvent vapor discharged from said second vessel to said condenser to separate said solvent and water, discontinuing the flow of steam through said mass of waste paper in said second vessel and forthwith applying suction to said second vessel to remove said stream therefrom, whereby said waste paper is recovered in a substantially dry state without substantial structural change but with said resinous material removed.

4. A process according to claim 3, in which said steam is superheated to a temperature of about 150° C. to 160° C.

5. A process for removing resinous material from waste paper, comprising the steps crushing and compacting a mass of said waste paper in a foraminous container, confining said waste paper mass in said container in a first one of four like pressure vessels having top and bottom conduit connections, continuously preheating a chlorinated hydrocarbon solvent to a temperature below 100° C., passing said preheated solvent through said mass of waste paper while stationary in said first vessel, conducting solvent discharged from first said vessel to an enclosed aqueous pressure zone, discharging superheated steam into the lower portion of said zone to vaporize said solvent while leaving said resinous material in aqueous suspension, conducting said steam and solvent vapor to a condensing zone to condense and separate said solvent and water and thereby recover said solvent for recycling; discontinuing the flow of said solvent through said mass in said first vessel and flowing superheated steam through said stationary mass in said first vessel to vaporize and remove said solvent from said mass, conducting said steam and solvent discharged from said first vessel to said condensing zone to separate said solvent and water, concurrently in like manner passing preheated solvent through a second compacted mass of waste paper in a second of said vessels and recovering said solvent; discontinuing the flow of said steam through said mass of waste paper in said first vessel and forthwith applying suction to said first vessel to remove said steam therefrom while concurrently in like manner passing steam through said second compacted mass of waste paper in said second vessel and passing preheated solvent through a third compacted mass of waste paper in a third of said vessels and recovering said solvent; opening said first vessel, removing said waste paper therefrom in a substantially dry state without substantial structural change but with the solvent extracted therefrom, loading a new charge of waste paper in said first vessel and closing said first vessel while concurrently in like manner applying suction to said second vessel, passing steam through said mass in said third vessel and passing preheated solvent through a fourth compacted mass of waste paper in a fourth of said vessels and recovering the solvent and continuing said steps in like manner.

6. A process according to claim 5, in which said preheated solvent is passed upwardly through said stationary compacted mass of waste paper in each of said vessels successively and said superheated steam is passed downwardly through said mass.

7. A process according to claim 5, in which the period of time during which said preheated solvent is passed through said stationary compacted mass paper in each one of said vessels successively while passing steam through the mass in another of said vessels and subjecting another of said vessels to a vacuum is of the order of 30 to 90 minutes.

References Cited by the Examiner

UNITED STATES PATENTS 2,703,754   3/1955   Myers _____ 162—5
3,058,871   10/1962  Davis _____ 162—5

DONALL H. SYLVESTER, *Primary Examiner.*

H. R. CAINE, *Assistant Examiner.*